(12) United States Patent
Gallardo

(10) Patent No.: US 8,580,022 B1
(45) Date of Patent: Nov. 12, 2013

(54) PORTABLE AIR PURIFICATION DEVICE

(76) Inventor: Jose F. Gallardo, Hawaiian Gardens, CA (US)

( * ) Notice: Subject to any disclaimer, the term of this patent is extended or adjusted under 35 U.S.C. 154(b) by 339 days.

(21) Appl. No.: 13/010,635

(22) Filed: Jan. 20, 2011

(51) Int. Cl.
*B01D 47/02* (2006.01)
*B01D 47/06* (2006.01)
*B01D 50/00* (2006.01)
*B01F 3/04* (2006.01)

(52) U.S. Cl.
USPC ............. 96/371; 95/149; 95/271; 55/355; 55/421; 55/431; 55/315

(58) Field of Classification Search
USPC .......... 96/329, 333, 337, 340, 343, 344, 345, 96/239–241, 256, 290, 294, 296, 298, 300, 96/355, 361, 151; 95/226; 15/353; 55/315, 55/421, 355, 431
See application file for complete search history.

(56) References Cited

U.S. PATENT DOCUMENTS

| 3,936,283 | A | | 2/1976 | Solis | |
|---|---|---|---|---|---|
| 4,473,923 | A | * | 10/1984 | Neroni et al. | 15/377 |
| 4,585,599 | A | | 4/1986 | Czarno | |
| 4,939,809 | A | | 7/1990 | Park | |
| 5,017,201 | A | | 5/1991 | Park | |
| 5,481,780 | A | * | 1/1996 | Daneshvar | 15/339 |
| 6,402,815 | B1 | | 6/2002 | Son | |
| 6,471,751 | B1 | * | 10/2002 | Semanderes et al. | 95/271 |

* cited by examiner

*Primary Examiner* — Robert A Hopkins
*Assistant Examiner* — Cabrena Hall

(57) ABSTRACT

The portable air purification device provides extreme portability such that the device can be placed virtually anywhere desired. Should an area need the device, one person can easily transport as needed. Also important is the separability of the vacuum canister and filtration canister. Often it may be advantageous to place the vacuum canister strategically, and the filtration canister supplying purified air in another location. The device provides for such via the separate canisters and the transfer hose, which can be almost any length needed. The device uses liquid filtration media, solid filtration media, and a HEPA filter.

9 Claims, 5 Drawing Sheets

PORTABLE AIR PURIFICATION DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Air purification and air scrubbing devices are well known. The present portable air purification device provides for inexpensive production and sale due to largely available components and also provides extreme portability.

FIELD OF THE INVENTION

The portable air purification device relates to air purification and air scrubbing devices.

SUMMARY OF THE INVENTION

The general purpose of the portable air purification device, described subsequently in greater detail, is to provide a portable air purification device which has many novel features that result in an improved portable air purification device which is not anticipated, rendered obvious, suggested, or even implied by prior art, either alone or in combination thereof.

To attain this, the portable air purification device provides extreme portability such that the device can be placed virtually anywhere desired. Should an area need the device, one person can easily transport as needed. Also important is the separability of the vacuum canister and filtration canister. Often it may be advantageous to place the vacuum canister strategically, and the filtration canister supplying purified air in another location. The device provides for such via the separate canisters and the transfer hose, which can be almost any length needed.

It is important the transfer hose may be reduced in diameter compared to the restriction fitting exiting the vacuum canister. It is also important that the intake hose may be of a smaller diameter than the expansion fitting diameter. These differences in diameters may ensure airflow velocity of the device. Equally important is that the filtration outlet may be of a larger diameter than the transfer hose so that little restriction exists in air outlet from the filtration canister. While the filtration canister may be provided without the HEPA filter and rely upon either the liquid medium or the solid medium or both liquid and solid medium, the most complete embodiment provides all three filtration efforts. Of further importance is the bypass hose that optionally connects the expansion fitting to the canister and avoids vacuum mechanism damage in the event of intake obstruction.

The step switch provides a convenience not had by other hand operated switches. The intake and transfer hoses may be flexible and thereby aid in portability and enable a user to position the components of the device as desired.

Thus has been broadly outlined the more important features of the improved portable air purification device so that the detailed description thereof that follows may be better understood and in order that the present contribution to the art may be better appreciated.

An object of the portable air purification device is to purify air.

Another object of the portable air purification device is to be extremely portable.

An added object of the portable air purification device is to provide separable vacuum canister and filtration canister.

And, an object of the portable air purification device is to provide a plurality of filtration media.

These together with additional objects, features and advantages of the improved portable air purification device will be readily apparent to those of ordinary skill in the art upon reading the following detailed description of presently preferred, but nonetheless illustrative, embodiments of the improved portable air purification device when taken in conjunction with the accompanying drawings.

DETAILED DESCRIPTION OF THE DRAWINGS

With reference now to the drawings, and in particular FIGS. 1 through 5 thereof, the principles and concepts of the portable air purification device generally designated by the reference number 10 will be described.

Figure 5:
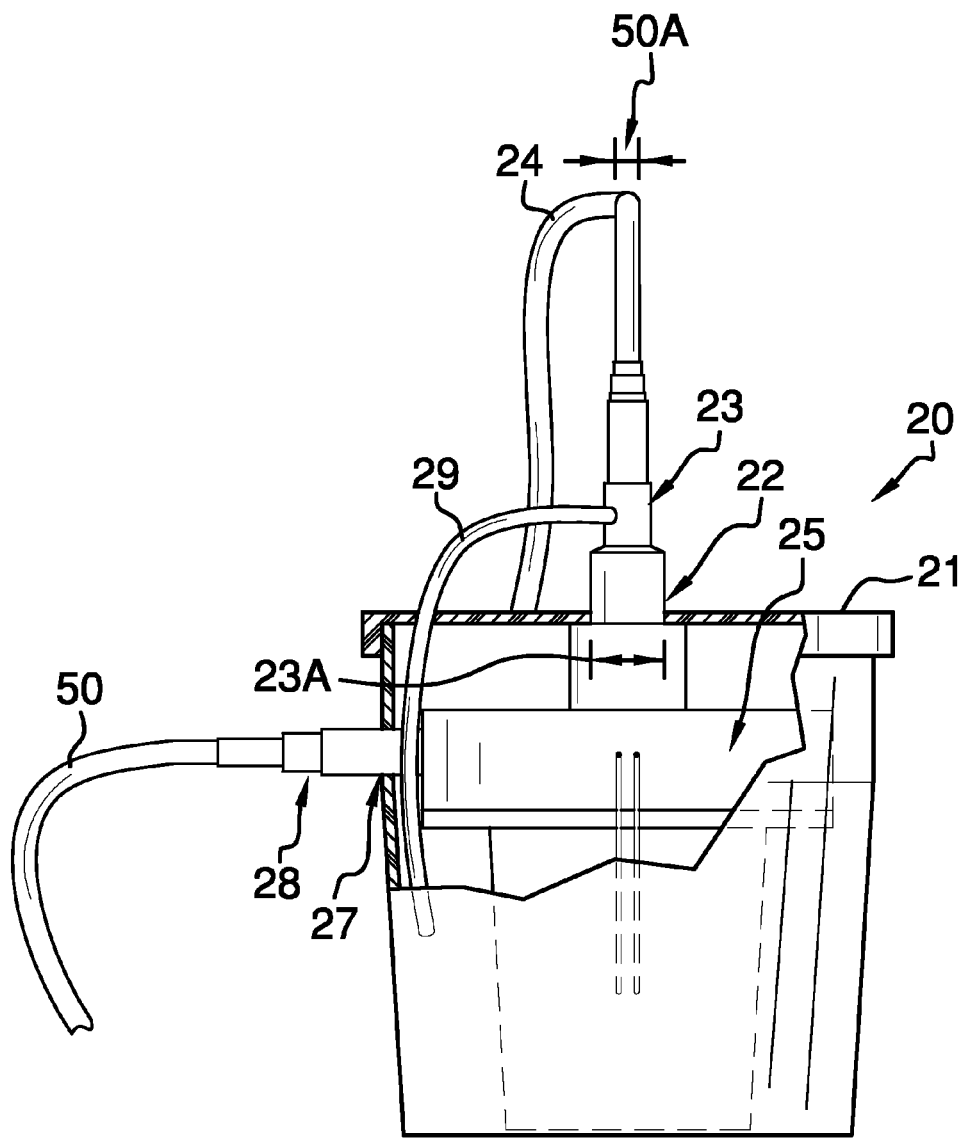
FIG. 5 is a partial cross sectional view of the vacuum canister.

Referring to FIG. 5, the device 10 partially comprises the vacuum canister 20. The sealed lid 21 is removably fitted to the vacuum canister 20. A sealed inlet 22 is attached the sealed lid 21. An expansion fitting 23 is attached to the sealed lid 21. The flexible intake hose 24 is connected to the expansion fitting 23. The intake hose 24 has a hose diameter 50A less than the fitting diameter 23A of the expansion fitting 23. A bypass hose 29 connects the expansion fitting 23 to the vacuum canister.

Figure 1:
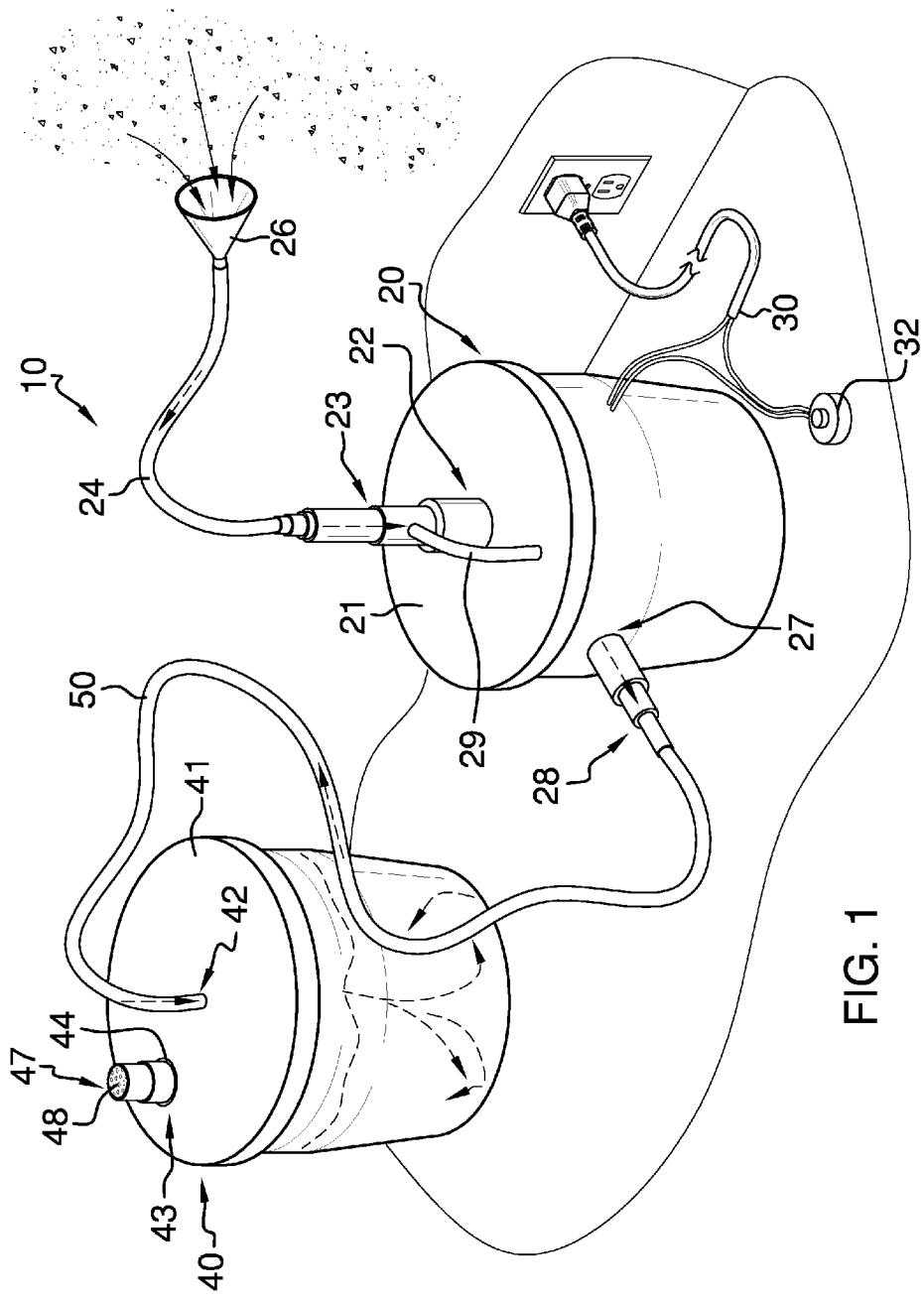
FIG. 1 is a perspective view.
Figure 2:
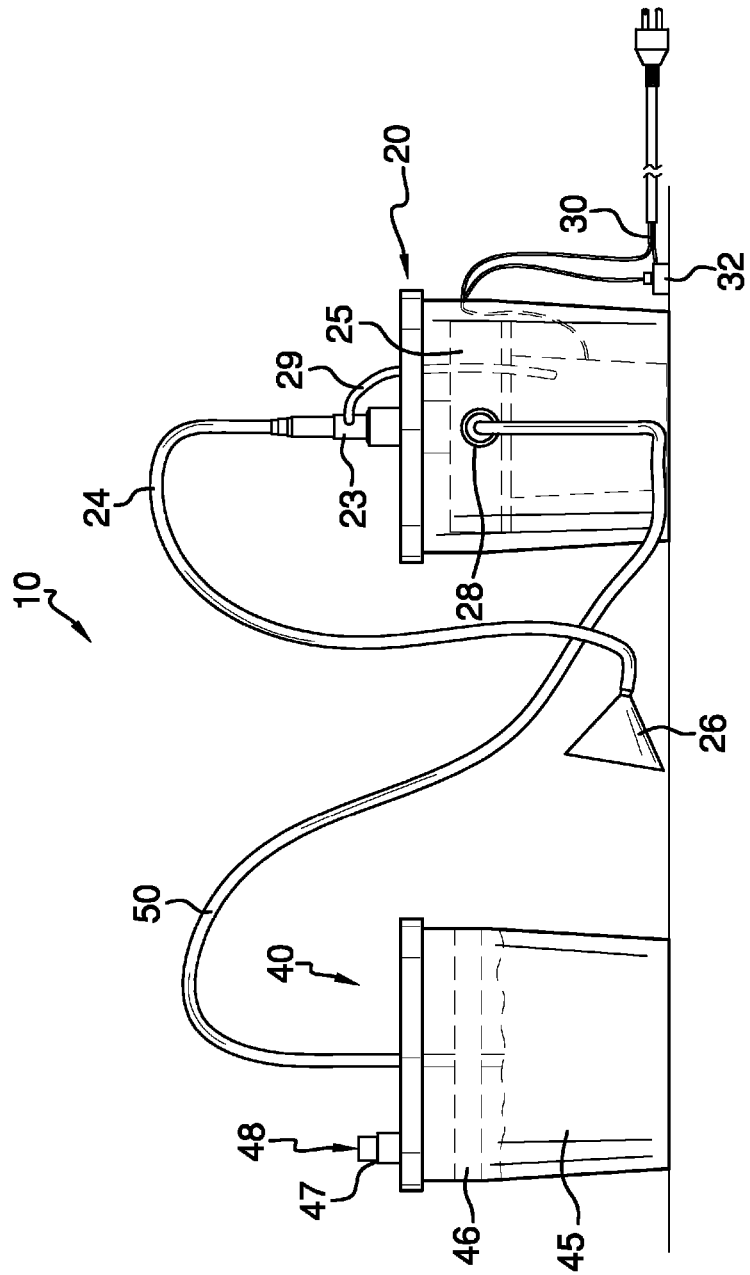
FIG. 2 is a lateral elevation view.

Referring to FIG. 2, the flared intake 26 is disposed distally on the intake hose 24.

Referring again to FIG. 5, the vacuum mechanism 25 is disposed within the vacuum canister 20. The vacuum mechanism 25 is in communication with the expansion fitting 23.

Referring again to FIG. 2, the power cord 30 exits from the vacuum canister 20. The power cord 30 is in communication with the vacuum mechanism 25. A step switch 32 is disposed within the power cord 30.

Referring again to FIG. 5, the sealed outlet 27 exits the vacuum canister 20 laterally. A restriction fitting 28 disposed within the sealed outlet 27.

Figure 4:
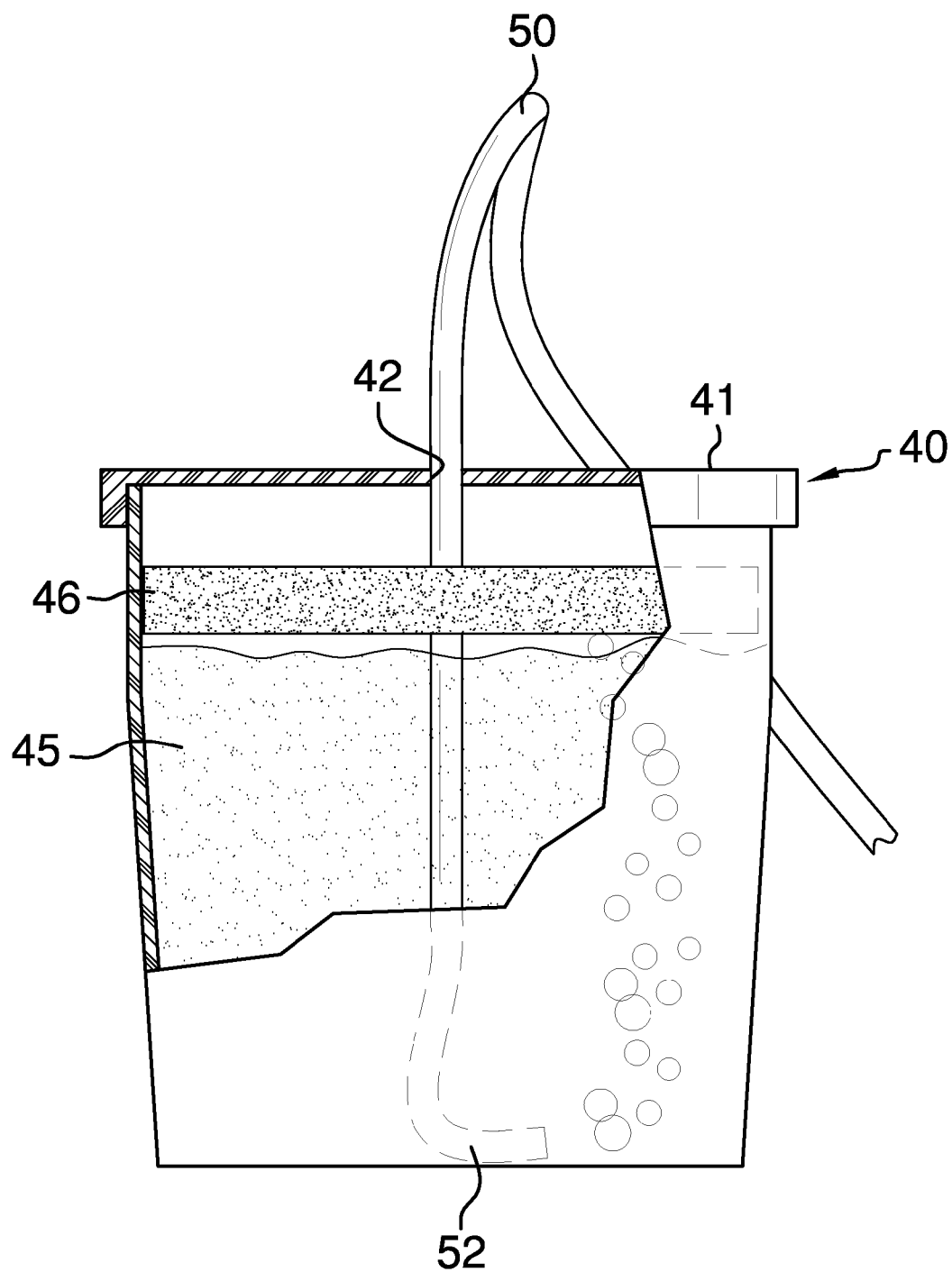
FIG. 4 is a partial cross sectional view of the filtration canister.

Referring to FIG. 4, the filtration canister 40 is provided. A liquid filtration medium 45 is disposed within the filtration canister 40. A solid filtration medium 46 is disposed within the filtration canister 40 above the liquid filtration medium 45. A sealed filtration lid 41 is removably fitted to the filtration canister 40.

Referring again to FIG. 1, the large orifice 43 is disposed laterally within the sealed filtration lid 41. A small orifice 42 is disposed centrally within the sealed filtration lid 41. A seal 44 is disposed within the large orifice 43. The filtration outlet 47 is disposed with the seal 44. The filtration outlet 47 has an outlet diameter 47A larger then the hose diameter 50A. A HEPA filter 48 is disposed within the filtration outlet 47.

Figure 3:
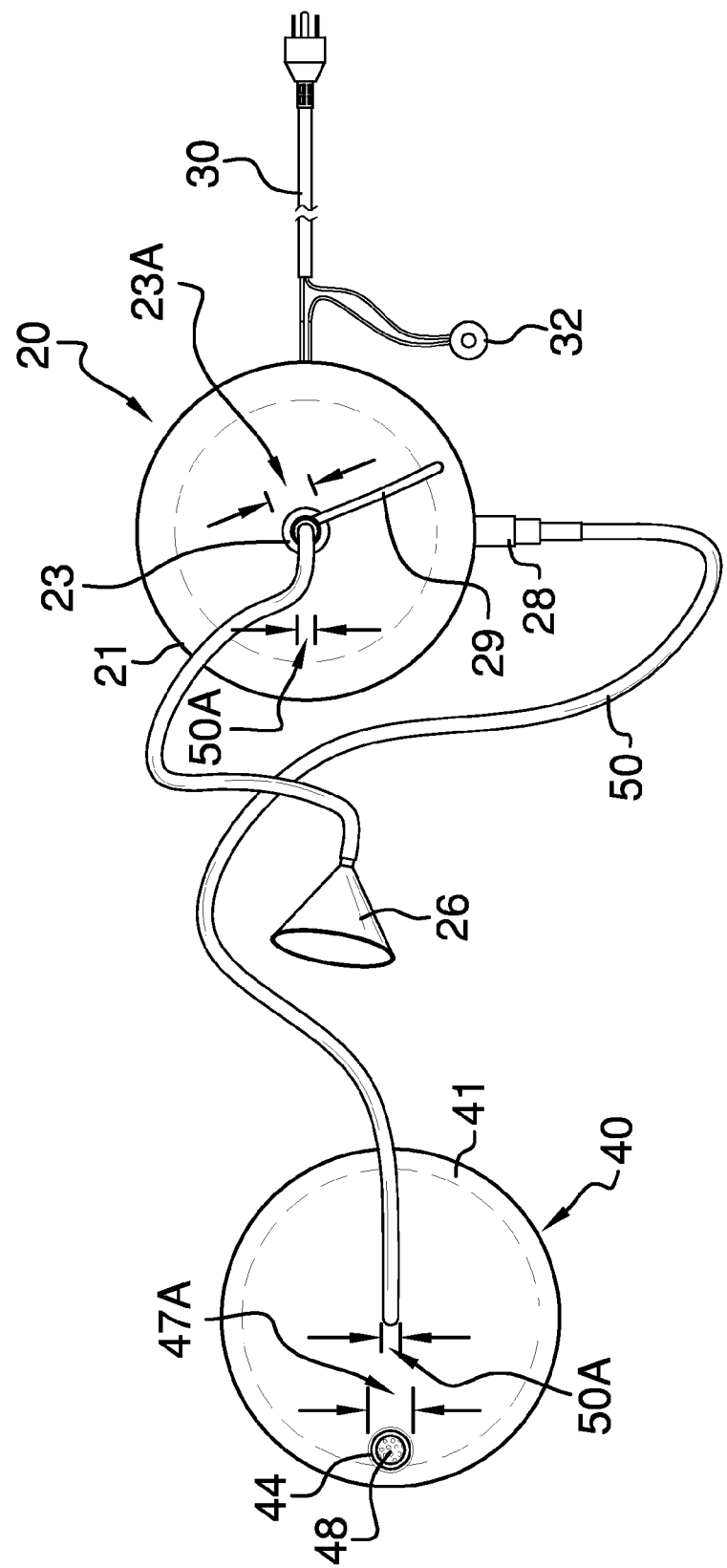
FIG. 3 is a top plan view.

Referring to FIG. 3, the flexible transfer hose 50 connects the vacuum canister 20 to the filtration canister 40. The transfer hose 50 is sealably fitted within the small orifice 42. The transfer hose 50 has a hose diameter 50A less then the filtration outlet 47.

Referring to FIG. 4, a hose crook 52 terminates the transfer hose 50. The hose crook 52 is disposed downwardly in the filtration canister 40 within the liquid filtration medium 45.

Referring again to FIG. 1, air is drawn into the flared intake 26 by the vacuum mechanism 25. Air is discharged from the vacuum canister 20 through the restriction fitting 28 and the transfer hose 50. Air enters the filtration canister 40 through the small orifice 42 and passes through the liquid filtration medium 45, then through the solid filtration medium 46. Air exits the filtration canister 40 through the filtration outlet 47 which houses the HEPA filter 48.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the portable air purification device may be used.

What is claimed is:

1. A portable air purification device comprising, in combination:
   a vacuum canister;
   a sealed lid removably fitted to the vacuum canister;
   a sealed inlet attaching the sealed lid to an expansion fitting;
   an intake hose connected to the expansion fitting, the intake hose having a hose diameter less than a fitting diameter of the expansion fitting;
   a bypass hose connecting the expansion fitting to the vacuum canister;
   a vacuum mechanism disposed within the vacuum canister, the vacuum mechanism in communication with the expansion fitting;
   a power cord exited from the vacuum canister, the power cord in communication with the vacuum mechanism;
   a switch disposed within the power cord;
   a sealed outlet exiting the vacuum canister laterally;
   a restriction fitting disposed within the sealed outlet;
   a filtration canister;
   a liquid filtration medium disposed within the filtration canister;
   a solid filtration medium disposed within the filtration canister above the liquid filtration medium;
   a sealed filtration lid removably fitted to the filtration canister;
   a large orifice disposed laterally within the sealed filtration lid;
   a small orifice disposed centrally within the filtration lid a seal disposed within the large orifice;
   a filtration outlet disposed with the seal, the filtration outlet having an outlet diameter larger than the hose diameter;
   a transfer hose connecting the vacuum canister to the filtration canister, the transfer hose sealably fitted within the small orifice, the transfer hose having a hose diameter less then the filtration outlet, the transfer hose extended downwardly within the filtration canister.

2. The device according to claim 1 wherein the switch further comprises a step switch.

3. The device according to claim 1 wherein the transfer hose further comprises a hose crook terminating the transfer hose, the hose crook disposed downwardly in the filtration canister within the liquid medium.

4. The device according to claim 2 wherein the transfer hose further comprises a crook terminating the transfer hose, the crook disposed downwardly in the filtration canister within the liquid filtration medium.

5. The device according to claim 1 wherein the intake hose further comprises a flared intake disposed distally on the intake hose.

6. The device according to claim 2 wherein the intake hose further comprises a flared intake disposed distally on the intake hose.

7. The device according to claim 3 wherein the intake hose further comprises a flared intake disposed distally on the intake hose.

8. The device according to claim 4 wherein the intake hose further comprises a flared intake disposed distally on the intake hose.

9. A portable air purification device comprising, in combination:
   a vacuum canister;
   a sealed lid removably fitted to the vacuum canister;
   a sealed inlet attaching the lid to an expansion fitting;
   a flexible intake hose connected to the expansion fitting, the intake hose having a hose diameter less than a fitting diameter of the expansion fitting;
   a bypass hose connecting the expansion fitting to the vacuum canister;
   a flared intake disposed distally on the intake hose;
   a vacuum mechanism disposed within the vacuum canister, the vacuum mechanism in communication with the expansion fitting;
   a power cord exited from the vacuum canister, the power cord in communication with the vacuum mechanism;
   a step switch disposed within the power cord;
   a sealed outlet exiting the vacuum canister laterally;
   a restriction fitting disposed within the sealed outlet;
   a filtration canister;
   a liquid filtration medium disposed within the filtration canister;
   a solid filtration medium disposed within the filtration canister above the liquid filtration medium;
   a sealed filtration lid removably fitted to the filtration canister;
   a large orifice disposed laterally within the filtration lid;
   a small orifice disposed centrally within the sealed filtration lid a seal disposed within the large orifice;
   a filtration outlet disposed with the seal, the filtration outlet having an outlet diameter larger than a transfer the hose diameter;
   a HEPA filter disposed within the filtration outlet;
   a flexible transfer hose connecting the vacuum canister to the filtration canister, the transfer hose sealably fitted within the small orifice, the transfer hose having the transfer hose filtration outlet;
   a hose crook terminating the transfer hose, the hose crook disposed downwardly in the filtration canister within the liquid filtration medium.

* * * * *